United States Patent [19]

LaBuda

[11] 4,257,229
[45] Mar. 24, 1981

[54] PRELOADED TORQUE CONVERTER WITH PLUG-IN FLYWHEEL MOUNTING

[75] Inventor: Edward F. LaBuda, Sterling Heights, Mich.

[73] Assignee: Borg-Warner Corporation, Chicago, Ill.

[21] Appl. No.: 48,336

[22] Filed: Jun. 14, 1979

[51] Int. Cl.³ .................. F16D 3/48; F16D 33/00
[52] U.S. Cl. ................................ 60/330; 60/349; 60/364; 64/10; 74/572
[58] Field of Search .......... 60/330, 338, 349, 364, 60/458, 469; 74/572; 64/10, 11 F

[56] References Cited

U.S. PATENT DOCUMENTS

| | | | |
|---|---|---|---|
| 3,300,971 | 1/1967 | Qualman et al. | 60/341 |
| 3,839,864 | 10/1974 | Ahlen | 60/349 |
| 3,940,947 | 3/1976 | Ahlen | 64/14 |

Primary Examiner—Irwin C. Cohen
Attorney, Agent, or Firm—James A. Geppert

[57] ABSTRACT

A torque converter assembly including means for reducing the axial thrust loading transmitted to the crankshaft by which the torque converter is driven and to thereby reduce thrust wear of the crankshaft bearing. This means includes a thrust washer loosely retained in the turbine hub of the torque converter and a shaft bolt securing the thrust washer and turbine hub to the end of a transmission input shaft driven by the torque converter. Also, the torque converter is coupled to the engine flywheel by a plug-in mounting comprising a plurality of drive lugs secured to the torque converter housing and received in aligned bores formed in the face of the flywheel.

9 Claims, 3 Drawing Figures

U.S. Patent  Mar. 24, 1981  4,257,229
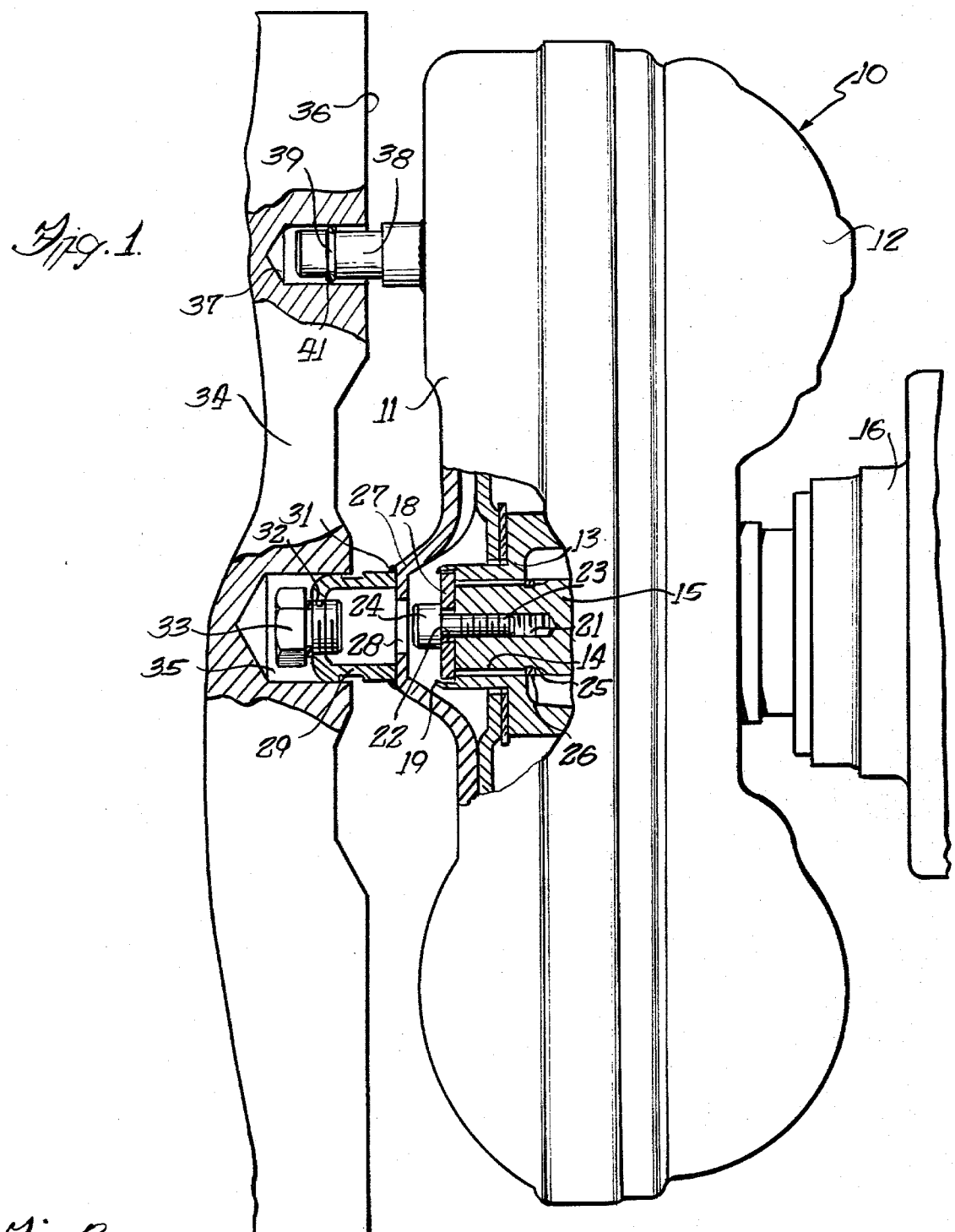
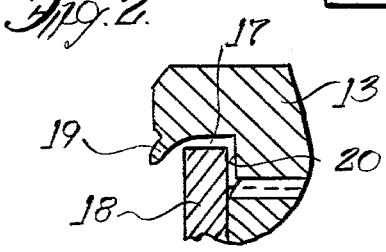
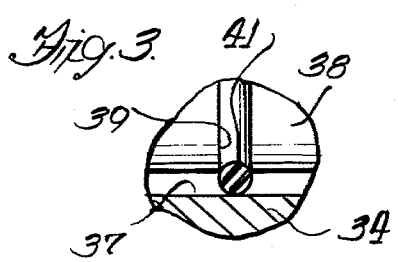

PRELOADED TORQUE CONVERTER WITH PLUG-IN FLYWHEEL MOUNTING

BACKGROUND OF THE INVENTION

In a conventional hydraulic torque converter, an internally splined turbine hub that receives the transmission input shaft tends to move axially relative to the shaft during operation to establish contact between an annular boss on the turbine hub and a thrust washer or a bearing in the end of the engine crankshaft. This end play results in a shock which is audible, such as a "clunk", and will tend to occur upon a reversal of torque as happens when the turbine goes from a drive condition of operation to a coast condition or from coast to drive.

In order to eliminate or reduce the shock loading and consequent noise, means have been provided to preload the turbine hub axially in a direction away from the thrust washer and towards the reactor hub. Such means include a small Belleville spring or a wave washer spring acting between the thrust washer at the impeller drive cover and the turbine hub. The present invention provides a simplified mounting of the torque converter on a transmission input shaft and a coupling of the torque converter to the engine flywheel.

SUMMARY OF THE INVENTION

The present invention comprehends the provision of a preloaded torque converter acting to reduce the axial thrust loading transmitted to the engine crankshaft driving the torque converter and thereby reduce the thrust wear of the crankshaft bearing. A thrust washer is loosely positioned in a recess in the end of the turbine hub and an access opening is provided in a cover pilot on the torque converter housing axially aligned with the washer, and the transmission input shaft has a tapped hole in the end thereof and a snap ring stop is mounted on the shaft spaced from the end. Once the torque converter is positioned on the shaft abutting the snap ring stop, a shaft bolt is inserted through the thrust washer into the tapped hole to secure the torque converter to the input shaft.

The present invention also comprehends the provision of a novel coupling between the torque converter and the flywheel. This coupling includes a plurality of equally spaced drive lugs secured to the cover for the torque converter and extending axially toward the flywheel to be received in openings bored in the face of the flywheel, thus providing a plug-in coupling.

Further objects are to provide a construction of maximum simplicity, efficiency, economy and ease of assembly, and such further objects, advantages and capabilities as will later more fully appear and are inherently possessed thereby.

DESCRIPTION OF THE DRAWING

FIG. 1 is a side elevational view, partially in cross section, of a flywheel and torque converter assembly incorporating the present invention therein.

FIG. 2 is an enlarged partial cross sectional view of the mounting of the thrust washer in the turbine hub recess.

FIG. 3 is an enlarged partial cross sectional view of the plug-in mounting for the torque converter in the flywheel.

DESCRIPTION OF THE PREFERRED EMBODIMENT

Referring more particularly to the disclosure in the drawing wherein is shown an illustrative embodiment of the present invention, FIG. 1 discloses a conventional torque converter 10 to be used in an automatic transmission of a vehicle and having a torque converter housing 11 suitably secured to an impeller shell 12 of an impeller and a turbine (not shown) having a hub 13 which is internally splined to receive the splined end 14 of a transmission input shaft 15 leading to the transmission pump assembly 16 of a transmission (not shown).

The turbine hub 13 has an end recess 17 receiving a thrust washer 18 loosely retained therein by rolling or staking an outer edge 19 defining the recess; the thrust washer 18 being free to float in the recess. The recess forms a shoulder 20 to be engaged by the thrust washer 18. The splined end of the shaft 15 is provided with a tapped hole 21 formed in the face axially aligned with the opening 22 in the thrust washer 18 to receive a shaft bolt 23 in threaded engagement. Also, spaced from the end face of the shaft, an annular groove 25 is machined in the splined end portion to receive a snap ring 26 to serve as a stop for the turbine hub 13.

The raised central portion 27 of the housing 11 has an opening 28 formed therein axially aligned with and of a diameter to permit the enlarged head 24 of the shaft bolt 23 to pass therethrough. A cover pilot 29 is seal welded at 31 to the housing portion 27 and has a threaded opening 32 in the end of the pilot to permit access of the shaft bolt 23 to the input shaft 15. The tapped hole is sealed by an O-ring type plug 33.

A flywheel 34 secured to the drive shaft of an internal combustion engine (not shown) has a central pilot recess 35 conformably receiving the cover pilot 29 therein. Also, a plurality of circumferentially equally spaced bores 37 are formed in the face 36 of the flywheel radially outwardly of the central recess and axially aligned with a series of equally spaced axially extending drive lugs 38 welded to the cover or housing 11. Each lug has an annular groove 39 machined therein to receive a round metallic snap ring 41; the snap ring creating a line bearing contact between the drive lug 38 and the flywheel bore 37 receiving the lug to take care of perpendicular misalignment.

For the installation of a torque converter into the vehicle drive line, the torque converter 10 is mounted on the transmission input shaft 15 and mated to the transmission pump assembly 16. The pilot hub plug 33 is removed from the cover pilot 29 and the shaft bolt 23 is inserted through the access openings 32 and 28 into the thrust washer opening 22 and into the tapped hole 21 in the shaft 15. Tightening this bolt causes the enlarged head 24 to engage the thrust washer 18 and force the thrust washer against the shoulder 20, thus urging the turbine hub 13 against the snap ring 26; so as to clamp the turbine hub between the thrust washer and snap ring stop and couple the torque converter assembly with the transmission pump assembly 16.

The plug 33 is re-installed in the opening 32 in the pilot cover 29, and the completed assembly is plugged into the engine flywheel 34; the cover pilot 29 being conformably received in the central flywheel recess 35 and the drive lugs 38 are received in the flywheel bores 37. The assembly is then secured to the vehicle engine by coupling a bell housing for the torque converter to the engine mounting face.

I claim:

1. In a torque converter of the type having an engine driven cover and impeller and a turbine having a hub, a transmission input shaft received in said turbine hub and driven by said turbine, the improvement comprising a thrust washer loosely retained in a recessed end of the turbine hub, said input shaft having a tapped opening in the end thereof, a stop on said shaft spaced from the end, and a shaft bolt having an enlarged head adapted to abut the thrust washer and extend through said washer to threadingly engage the shaft opening.

2. A torque converter as set forth in claim 1, in which said turbine hub is clamped by said shaft bolt between the thrust washer and the shaft stop.

3. A torque converter as set forth in claim 2, wherein a groove is formed in the input shaft spaced from the end thereof, and said stop comprises a snap ring received in said groove.

4. A torque converter as set forth in claim 1, wherein said cover has a raised central portion with an access opening therein to allow the shaft bolt to pass therethrough.

5. A torque converter as set forth in claim 4, including a cover pilot secured onto the raised cover portion and having a threaded access opening therein axially aligned with the opening in the cover, the thrust washer and the tapped shaft opening.

6. A torque converter as set forth in claim 5, including a cover pilot plug threadingly engaging the access opening, and a flywheel driven by a vehicle engine and operatively connected to said torque converter cover, said flywheel having a central recess receiving said cover pilot.

7. A torque converter as set forth in claim 1, wherein said recess in the turbine hub forms a shoulder abutted by said thrust washer, said cover having a raised central portion with an access opening aligned with said tapped opening, said thrust washer having a central opening receiving said shaft bolt, a cover pilot secured on said raised cover portion and having a threaded access opening, a cover pilot plug threadingly engaging said threaded opening, said shaft having an annlar groove formed therein spaced from the end, said stop comprising a snap ring received in said groove, and an engine driven flywheel operatively connected to said cover and having a central recess receiving said cover pilot.

8. In a torque converter assembly of the type having a cover operatively connected to an engine driven flywheel, an impeller secured to said cover and a turbine driving a transmission input shaft, the improvement comprising a plug-in connection between said cover and said flywheel and including a plurality of circumferentially equally spaced axially extending drive lugs secured to the surface of said cover facing said flywheel, said flywheel surface facing said cover having a series of spaced bores therein receiving said drive lugs, each drive lug having an annular groove formed therein, and a round metallic snap ring received in each groove to engage the interor surface of said flywheel bore.

9. A torque converter as set forth in claim 8, in which said drive lugs are welded to said cover, and said snap rings create a line bearing contact between each said drive lug and associated flywheel bore to take care of any perpendicular misalignment.

* * * * *